I. T. DYER.

Mold-Boards for Plows.

No. 5,848. Reissued April 28, 1874.

Attest.

J. W. Elliott.

P. H. Dickie

Inventor.

Isaac T. Dyer

By G. L. Chapin,

Atty.

AM. PHOTO-LITHOGRAPHIC Co. N. Y. (OSBORNE'S PROCESS.)

UNITED STATES PATENT OFFICE.

ISAAC T. DYER, OF CHICAGO, ILLINOIS, ASSIGNOR TO PHILLIP H. DECKER.

IMPROVEMENT IN MOLD-BOARDS FOR PLOWS.

Specification forming part of Letters Patent No. 113,642, dated April 11, 1871; reissue No. 5,848, dated April 28, 1874; application filed February 27, 1874.

*To all whom it may concern:*

Be it known that I, ISAAC T. DYER, of Chicago, in county of Cook and State of Illinois, have invented certain new and useful Improvements in Mold-Boards for Plows, of which the following is a specification:

The nature of the present invention consists in a mold-board for plows provided with a series of anti-friction rollers, of suitable shape to conform to the contour of the mold-board, and of such size as will be rotated by the soil when the plow is moved through it, in combination with V-shaped clearing-bars, and to obviate in a great measure the friction of the earth coming in contact, and to clean the rollers, and keep them free from soil, as the whole is hereinafter fully described and shown.

Figure 1:
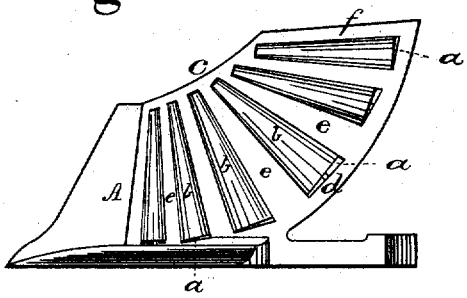
Figure 2:
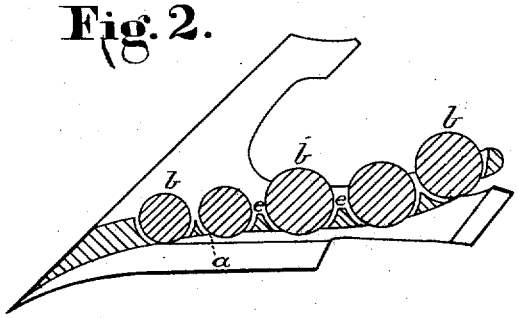

In the drawings accompanying this specification, Figure 1 is an elevation of a mold-board for plows provided with my improvement in anti-friction rollers. Fig. 2, a transverse section of the rollers, showing their position in the mold-board.

A represents the share of a mold-board of an ordinary plow, which terminates backwardly in a skeleton frame, *c d f*, of such strength as to support anti-friction rollers *b*, the part *d* forming a bar at the top edge of the mold-board, the part *c* a bar at the lower edge, and part *f* a bar at the rear edge of the mold-board. These bars and the share A inclose the rollers, which are made of any suitable material, and pivoted to the bars *c d* so as to rotate as the plow passes through the soil, and by being thus pivoted obviate very much of the friction arising from the contact of the earth with the ordinary mold-board. The form of the rollers is conical, as shown, that shape being best adapted to shape of the mold-board of the ordinary plow; but mold-boards might be of such form as to require a modification of the shape of the rollers; therefore I do not confine myself to form shown. In the drawings are shown what are termed transverse clearing-bars *e*, between the rollers *b*. These bars *d* give strength to the longitudinal bars, and keep the conical rollers clean. Their peculiar form in transverse section allow them to be set very closely to the rollers, and thus prevent earth from sticking to them or being carried between them. The bars *d* may be cast solid to the upper and lower bar, or may be fastened to them by bolts, as most convenient. The rollers should be set so that their faces come even with the plane of the share and skeleton, or a little in front, so that the soil will readily come in contact with them.

I claim and desire to secure by Letters Patent—

A mold-board for plows provided with a series of rollers, three or more, in combination with the transverse clearing-bars *e*, bars *c d*, and share A, as and for the purpose set forth.

ISAAC T. DYER.

Witnesses:
G. L. CHAPIN,
J. H. ELLIOTT.